United States Patent
Vu et al.

(10) Patent No.: US 11,702,341 B2
(45) Date of Patent: Jul. 18, 2023

(54) METHOD FOR THE MANUFACTURE OF GRAPHENE OXIDE FROM KISH GRAPHITE

(71) Applicant: ArcelorMittal, Luxembourg (LU)

(72) Inventors: Thi Tan Vu, Oviedo (ES); Maria Cabanas Corrales, Oviedo (ES); Abel Alvarez-Alvarez, Trubia-Oviedo Asturias (ES)

(73) Assignee: ArcelorMittal, Luxembourg (LU)

( * ) Notice: Subject to any disclaimer, the term of this patent is extended or adjusted under 35 U.S.C. 154(b) by 788 days.

(21) Appl. No.: 16/499,431

(22) PCT Filed: Mar. 26, 2018

(86) PCT No.: PCT/IB2018/052038
§ 371 (c)(1),
(2) Date: Sep. 30, 2019

(87) PCT Pub. No.: WO2018/178842
PCT Pub. Date: Oct. 4, 2018

(65) Prior Publication Data
US 2021/0094829 A1    Apr. 1, 2021

(30) Foreign Application Priority Data
Mar. 31, 2017   (WO) .................. PCT/IB2017/000350

(51) Int. Cl.
*C01B 32/198* (2017.01)
*C01B 32/23* (2017.01)

(52) U.S. Cl.
CPC ............ *C01B 32/198* (2017.08); *C01B 32/23* (2017.08); *C01B 2204/04* (2013.01); *C01P 2004/20* (2013.01)

(58) Field of Classification Search
CPC ..... C01B 32/182; C01B 32/19; C01B 32/196; C01B 2204/02; C01B 2204/04; C01B 2204/30; C01B 2204/32
See application file for complete search history.

(56) References Cited

U.S. PATENT DOCUMENTS

| 1,614,352 A | 1/1927 | Eugene |
| 5,672,327 A | 9/1997 | Bennet et al. |
| 2016/0083552 A1 | 3/2016 | Nosker et al. |

FOREIGN PATENT DOCUMENTS

| CN | 101993061 A | 3/2011 |
| CN | 102020270 A | 4/2011 |
| CN | 103613095 A | 3/2014 |
| CN | 104059618 A | 9/2014 |
| CN | 104340967 A | 2/2015 |
| CN | 104477887 A | 4/2015 |

(Continued)

OTHER PUBLICATIONS

An, Jung-Chui, Hye Jeong Kim, and Ikpyo Hong. "Preparation of Kish graphite-based graphene nanoplatelets by GIC (graphite intercalation compound) via process." Journal of Industrial and Engineering Chemistry 26 (2015): 55-60.*

(Continued)

*Primary Examiner* — Richard M Rump
(74) *Attorney, Agent, or Firm* — Davidson, Davidson & Kappel, LLC

(57) ABSTRACT

The present invention provides a method for the manufacture of graphene oxide from Kish graphite.

18 Claims, 1 Drawing Sheet

(56) References Cited

FOREIGN PATENT DOCUMENTS

| | | | |
|---|---|---|---|
| CN | 204529315 U | 8/2015 | |
| CN | 104925787 A | 9/2015 | |
| CN | 104944414 A | 9/2015 | |
| CN | 105324241 A | 2/2016 | |
| JP | S49112898 A | 10/1974 | |
| JP | S57170812 A | 10/1982 | |
| JP | S61158807 A | 7/1986 | |
| JP | 2014001126 A | 1/2014 | |
| KR | 101109961 B1 | 2/2012 | |
| KR | 20120134685 A | 12/2012 | |
| KR | 101382964 B1 | 4/2014 | |
| UA | 71602 U | 5/2012 | |
| WO | WO2016053889 A1 | 4/2016 | |
| WO | 2017027731 A1 | 2/2017 | |

OTHER PUBLICATIONS

Tang, Libin, et al. "Bottom-up synthesis of large-scale graphene oxide nanosheets." Journal of Materials Chemistry 22.12 (2012): 5676-5683.*
Laverty, P. D. et al., "Recovery of Flake Graphite From Steelmaking Kish", Report of Investigations, 1994.
International Search Report of PCT/IB2018/052038, dated May 24, 2018.

\* cited by examiner

METHOD FOR THE MANUFACTURE OF GRAPHENE OXIDE FROM KISH GRAPHITE

The present invention relates to a method for the manufacture of graphene oxide from Kish graphite. In particular, graphene oxide will have applications in metal industries including steel, aluminum, stainless steel, copper, iron, copper alloys, titanium, cobalt, metal composite, nickel industries, for example as coating or as a cooling reagent.

BACKGROUND

Kish graphite is a byproduct generated in the steelmaking process, especially during the blast furnace process or iron making process. Indeed, Kish graphite is usually produced on the free surface of molten iron during its cooling. It comes from molten iron at 1300-1500° C., which is cooled at a cooling rate between 0.40° C./min and 25° C./h when transported in the torpedo car or at higher cooling rates during the ladle transfer. An extensive tonnage of Kish graphite is produced annually in a steel plant.

Since Kish graphite comprises a high amount of carbon, usually above 50% by weight, it is a good candidate to produce graphene based materials. Usually, Graphene based materials include: graphene, graphene oxide, reduced graphene oxide or nanographite.

Graphene oxide is composed of one or few layers of graphene sheets containing oxygen functional groups. Thanks to its interesting properties such as a high thermal conductivity and a high electrical conductivity, graphene oxide has many applications as mentioned above. Moreover, the presence of oxygen functional groups make it hydrophilic and therefore it can be easily dispersed in water.

Usually, graphene oxide is synthesized based on Hummer Method comprising the following steps:
the creation of a mixture of Kish graphite, sodium nitrate and sulfuric acid,
the addition of sodium permanganate as oxidizing agent to oxidize graphite into graphite oxide and
the mechanical exfoliation of graphite oxide into monolayer or a few layers of graphene oxide.

The patent KR101109961 discloses a method of manufacturing graphene, comprising:
a step of pretreating Kish graphite,
a step of manufacturing graphite oxide by oxidizing the pretreated Kish graphite with an acid solution;
a step of manufacturing graphene oxide by exfoliating the graphite oxide and
a step of manufacturing reduced graphene oxide by reducing the graphene oxide with a reducing agent.

In this Korean patent, the pre-treatment of Kish graphite comprises: a flushing process, a process of purification using a chemical pretreatment composition and a mechanical separation process (separation by size). After the process of purification, the purified Kish graphite is separated by size, the Kish graphite having a particle size of 40 mesh or less, i.e. 420 μm or less, is kept for the manufacture of graphene oxide.

However, the pretreatment of Kish graphite comprises 2 steps using a chemical composition: the flushing step and the process of purification step. In the Example of KR101109961, the flushing step is performed with an aqueous solution comprising water, hydrochloric acid and nitric acid. Then, the process of purification is performed with a pretreatment composition comprising a chelating agent, an iron oxide remover, a surfactant, an anionic and nonionic polymer dispersant and distilled water. At industrial scale, two chemical treatments are difficult to manage since a lot of chemical waste has to be treated and the stability of such composition is difficult to control. Moreover, the pretreatment composition needs a long time preparation. The productivity is therefore slowed. Finally, the pre-treatment of Kish graphite including the process of purification using the pretreatment composition is not environmentally friendly.

The patent KR10-1382964 discloses a method for separating kish graphite comprising the following steps:
a classifying and sorting step for classifying by-products of the steelmaking process and sorting kish graphite-containing samples having a predetermined range of particle sizes;
a floating sorting step for making the kish graphite-containing samples into an aqueous solution and separating kish graphite samples floating in the upper portion of the aqueous solution;
a crushing step for crushing the separated kish graphite sample to remove iron and iron oxide particles in the sample; and
a separating and collecting step for separating and collecting the crushed kish graphite sample from the iron and iron oxide particles.

However, by performing the crushing step, being a mechanical or physical process, there is a risk to damage the Kish graphite layers and therefore the quality of the graphene oxide. Moreover, in the Examples, the purity of Kish graphite is maximum of 90%. Finally, in this patent, an oxidation step is performed on the pre-treated kish graphite by using a concentrated strong acid. Indeed, in the Examples, the oxidation step is performed with sulfuric acid or fuming sulfuric acid having a concentration around 100%. The oxidation step is very dangerous for human people and difficult to manage at industrial scale.

BRIEF SUMMARY OF THE INVENTION

The purpose of the invention is to provide an easy to implement method for the manufacture of graphene oxide from high purity Kish graphite. In particular, the object is to provide an environmentally friendly method to obtain graphene oxide having good quality.

The present invention provides a method for the manufacture of graphene oxide from kish graphite. The method comprises:
A) providing kish graphite;
B) pre-treating the kish graphite comprising the following successive steps:
  i. a sieving step wherein the kish graphite is classified by size as follows:
    a) Kish graphite having a size below 50 μm,
    b) Kish graphite having a size above or equal to 50 μm, the fraction a) of kish graphite having a size below 50 μm being removed,
  ii. a flotation step with the fraction b) of kish graphite having a size above or equal to 50 μm,
  iii. an acid leaching step wherein an acid is added so that the ratio in weight (acid amount)/(kish graphite amount) is between 0.25 and 1.0,
  iv. optionally, the kish graphite is washed and dried and,
C) oxidizing the pre-treated kish-graphite obtained after step B) in order to obtain graphene oxide.

The following terms are defined:
Graphene oxide means one or a few layer(s) of graphene comprising at least 25% by weight of oxygen functional groups, Oxygen functional groups means ketone groups, carboxyl groups, epoxy groups and hydroxyl groups and A flotation step means a process for selectively separating Kish graphite which is hydrophobic material from hydrophilic materials.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

Figure 1:
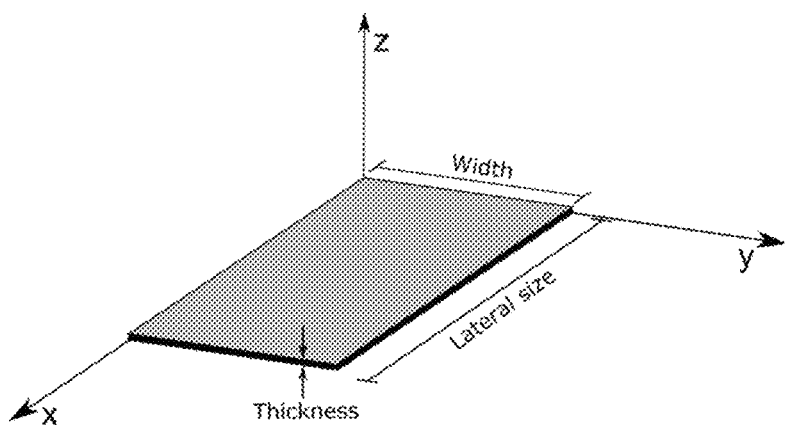
FIG. 1 illustrates an example of one layer of graphene oxide according to the present invention.

The invention relates to a method for the manufacture of graphene oxide from kish graphite comprising:
A. The provision of kish graphite,
B. A pre-treatment step of said kish graphite comprising the following successive sub-steps:
  i. A sieving step wherein the kish graphite is classified by size as follows:
    a) Kish graphite having a size below 50 μm,
    b) Kish graphite having a size above or equal to 50 μm, the fraction a) of kish graphite having a size below 50 μm being removed,
  ii. A flotation step with the fraction b) of kish graphite having a size above or equal to 50 μm,
  iii. An acid leaching step wherein an acid is added so that the ratio in weight (acid amount)/(kish graphite amount) is between 0.25 and 1.0,
  iv. Optionally, the kish graphite is washed and dried and
C. An oxidation step of the pre-treated kish-graphite obtained after step B) in order to obtain graphene oxide.

Without willing to be bound by any theory, it seems that the method according to the present invention allows for the production of graphene oxide having good quality from high purity pre-treated Kish graphite. Indeed, the Kish graphite obtained after step B) has a purity of at least 90%. Moreover, the pre-treatment step B) is easy to implement at industrial scale and is more environmentally friendly than conventional methods.

Preferably, in step A), the Kish graphite is a residue of the steelmaking process. For example, it can be found in a blast furnace plant, in an iron making plant, in the torpedo car and during ladle transfer.

In step B.i), the sieving step can be performed with a sieving machine.

After the sieving, the fraction a) of Kish graphite having a size below 50 μm is removed. Indeed, without willing to bound by any theory, it is believed that the kish graphite having a size below 50 μm contains a very small quantity of graphite, for example less than 10%.

Preferably in step B.ii), the flotation step is performed with a flotation reagent in an aqueous solution. For example, the flotation reagent is a frother selected from among: methyl isobutyl carbinol (MIBC), pine oil, polyglycols, xylenol, S-benzyl-S'-n-butyl trithiocarbonate, S,S'-dimethyl trithiocarbonate and S-ethyl-S'-methyl trithiocarbonate. Advantageously, the flotation step is performed using a flotation device.

Preferably, in step B.i), the fraction a) of kish graphite having a size below 55 μm is removed and in step B.ii), the fraction b) of kish graphite has a size above or equal to 55 μm. More preferably, in step B.i), the fraction a) of kish graphite having a size below 60 μm is removed and wherein in step B.ii), the fraction b) of kish graphite has a size above or equal to 60 μm.

Preferably, in steps B.i) and B.ii), the fraction b) of kish graphite has a size below or equal to 300 μm, any fraction of kish graphite having a size above 300 μm being removed before step B.ii).

More preferably in steps B.i) and B.ii), the fraction b) of kish graphite has a size below or equal to 275 μm, any fraction of kish graphite having a size above 275 μm being removed before step B.ii).

Advantageously, in steps B.i) and B.ii), the fraction b) of kish graphite has a size below or equal to 250 μm, any fraction of kish graphite having a size above 250 μm being removed before step B.ii).

In step B.iii), the (acid amount)/(kish graphite amount) ratio in weight is between 0.25 and 1.0, advantageously between 0.25 and 0.9, more preferably between 0.25 and 0.8. For example, the (acid amount)/(kish graphite amount) ratio in weight is between 0.4 and 1.0, between 0.4 and 0.9 or between 0.4 and 1. Indeed, without willing to be bound by any theory, it seems that if the (acid amount)/(kish graphite amount) ratio is below the range of the present invention, there is a risk that the kish graphite comprises a lot of impurities. Moreover, it is believed that if the (acid amount)/(kish graphite amount) ratio is above the range of the present invention, there is a risk that a huge amount of chemical waste is generated.

Preferably, in step B.iii), the acid is selected among the following elements: chloride acid, phosphoric acid, sulfuric acid, nitric acid or a mixture thereof.

The pre-treated Kish graphite obtained after step B) of the method according to the present invention has a size above or equal to 50 μm. The pre-treated Kish graphite has a high purity, i.e. at least of 90%. Moreover, the degree of crystallinity is improved compared to conventional methods allowing higher thermal and electrical conductivities and therefore higher quality.

Preferably, step C) comprises the following sub-steps:
  i. The preparation of a mixture comprising the pre-treated kish-graphite, an acid and optionally sodium nitrate, the mixture being kept at a temperature below 5° C.,
  ii. The addition of an oxidizing agent into the mixture obtained in step C.i),
  iii. After the targeted level of oxidation is reached, the addition of an element to stop the oxidation reaction,
  iv. Optionally, the separation of graphite oxide from the mixture obtained in step C.iii),
  v. Optionally, the washing of the graphite oxide,
  vi. Optionally, the drying of the graphite oxide and
  vii. The exfoliation into graphene oxide.

Preferably in step C.i), the acid is selected among the following elements: chloride acid, phosphoric acid, sulfuric acid, nitric acid or a mixture thereof. In a preferred embodiment, the mixture comprises the pre-treated kish-graphite, sulfuric acid and sodium nitrate. In another preferred embodiment, the mixture comprises the pre-treated kish-graphite, sulfuric acid and phosphoric acid.

Preferably in step C.ii), the oxidizing agent is chosen from: sodium permanganate ($KMnO_4$), $H_2O_2$, $O_3$, $H_2S_2O_8$, $H_2SO_5$, $KNO_3$, $NaClO$ or a mixture thereof. In a preferred embodiment, the oxidizing agent is sodium permanganate.

Then, advantageously in step C.iii), the element used to stop the oxidation reaction is chosen from: an acid, non-deionized water, deionized water, $H_2O_2$ or a mixture thereof.

In a preferred embodiment, when at least two elements are used to stop the reaction, they are used successively or simultaneously. Preferably, deionized water is used to stop the reaction and then $H_2O_2$ is used to eliminate the rest of the oxidizing agent. In another preferred embodiment, hydrochloric acid is used to stop the reaction and then $H_2O_2$ is used to eliminate the rest of the oxidizing agent. In another preferred embodiment, $H_2O_2$ is used to stop the reaction and eliminate the rest of the oxidizing agent by this following reaction:

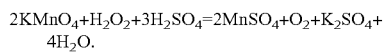

Without willing to be bound by any theory, it seems that when the element to stop the reaction is added into the mixture, there is a risk that this addition is too exothermic resulting in explosion or splashing. Thus, preferably in step C.iii), the element used to stop the reaction is slowly added into the mixture obtained in step C.ii). More preferably, the mixture obtained in step C.ii) is gradually pumped into the element used to stop the oxidation reaction. For example, the mixture obtained in step C.ii) is gradually pumped into deionized water to stop the reaction.

Optionally in step C.iv), graphite oxide is separated from the mixture obtained in step C.iii). Preferably, the graphene oxide is separated by centrifugation, by decantation or filtration.

Optionally in step C.v), graphite oxide is washed. For example, graphene oxide is washed with an element chosen from among: deionized water, non-deionized water, an acid or a mixture thereof. For example, the acid is selected among the following elements: chloride acid, phosphoric acid, sulfuric acid, nitride acid or a mixture thereof.

In a preferred embodiment, steps C.iv) and C.v) are performed successively, i.e. step C.iv) followed by step C.v). In another preferred embodiment, steps C.v) is performed before C.iv).

For example, steps C.iv) and C.v) are performed at least two times independently of each other.

Optionally in step C.vi), the graphite oxide is dried, for example with air or at high temperature in the vacuum condition.

Preferably in step C.vii), the exfoliation is performed by using ultrasound or thermal exfoliation. Preferably, the mixture obtained in step C.iii) is exfoliated into one or a few layers of graphene oxide.

By applying the method according to the present invention, Graphene oxide having an average lateral size between 5 and 50 μm, preferably between 10 and 40 μm and more preferably between 20 and 35 μm comprising at least one layer sheet is obtained.

FIG. 1 illustrates an example of one layer of graphene oxide according to the present invention. The lateral size means the highest length of the layer through the X axis, the thickness means the height of the layer through the Z axis and the width of the nanoplatelet is illustrated through the Y axis.

Figure 2:
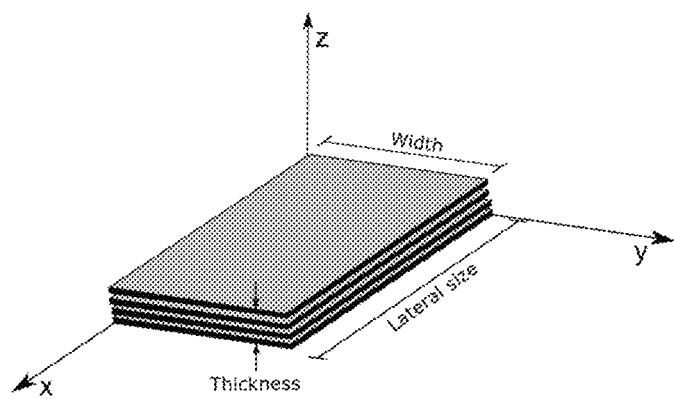
FIG. 2 illustrates an example of a few layers of graphene oxide according to the present invention.

FIG. 2 illustrates an example of a few layers of graphene oxide according to the present invention. The lateral size means the highest length of the layer through the X axis, the thickness means the height of the layer through the Z axis and the width of the nanoplatelet is illustrated through the Y axis.

The obtained graphene oxide has good quality since it is produced from the pre-treated Kish graphite of the present invention. Moreover, the graphene oxide having a high specific surface area 500 $m^2g^{-1}$, is easy dispersible in water and other organic solvents due to the presence of the oxygen functionalities.

Preferably, graphene oxide is deposited on metallic substrate steel to improve some properties such as corrosion resistance of a metallic substrate.

In another preferred embodiment, graphene oxide is used as cooling reagent. Indeed, graphene oxide can be added to a cooling fluid. Preferably, the cooling fluid can be chosen from among: water, ethylene glycol, ethanol, oil, methanol, silicone, propylene glycol, alkylated aromatics, liquid Ga, liquid In, liquid Sn, potassium formate and a mixture thereof. In this embodiment, the cooling fluid be used to cool down a metallic substrate.

For example, the metallic substrate is selected from among: aluminum, stainless steel, copper, iron, copper alloys, titanium, cobalt, metal composite, nickel.

The invention will now be explained in trials carried out for information only. They are not limiting.

EXAMPLES

Trials 1 and 2 were prepared by providing Kish graphite from steelmaking plant. Then, Kish graphite was sieved to be classified by size as follows:

a) Kish graphite having a size below <63 μm and
b) Kish graphite having a size above or equal to 63 μm.

The fraction a) of Kish graphite having a size below 63 μm was removed.

For Trial 1, a flotation step with the fraction b) of Kish graphite having a size above or equal to 63 μm was performed. The flotation step was performed with a Humboldt Wedag flotation machine with MIBC as frother. The following conditions were applied:
Cell volume (l): 2,
Rotor speed (rpm): 2000,
Solid concentration (%): 5-10,
Frother, type: MIBC,
Frother, addition (g/T): 40,
Conditioning time (s): 10 and
Water conditions: natural pH, room-temperature.

Trials 1 and 2 were then leached with the hydrochloric acid in aqueous solution. Trials were then washed with deionized water and dried in air at 90° C.

After, Trials 1 and 2 were mixed with sodium nitrate and sulfuric acid in an ice-bath. Potassium permanganate was slowly added into Trials 1 and 2. Then, mixtures were transferred into water bath and kept at 35° C. for 3 h to oxidize the Kish graphite.

After 3 hours, Trials were gradually pumped into deionized water. The temperature of mixtures was of 70° C.

After stopping the oxidation reaction, the heat was removed and around 10-15 mL of $H_2O_2$ in aqueous solution was added until there was no gas producing and mixtures were stirred 10 minutes to eliminate the rest of $H_2O_2$.

Then Trials were exfoliated using ultrasound in order to obtain one or two layer(s) of graphene oxide.

Finally, graphene oxide of Trials 1 and 2 were separated from the mixture by centrifugation, washed with water and dried with air.

Trial 3 is the Example 3 prepared according to the method of the Korean patent KR101382964.

Trial 4 is the disclosed Example prepared according to the method of the Korean patent KR101109961.

Table 1 shows the results obtained with Trial 1 to 4.

| Method | | Trial 1* | Trial 2 | Trial 3 (KR101382964) | Trial 4 (KR101109961) | |
|---|---|---|---|---|---|---|
| Origin of Kish graphite | | Steelmaking plant | Steelmaking plant | Steelmaking process | Steel-mill byproduct | |
| Pre-treatment of Kish graphite | Sieving step | Done, Kish graphite having a size above or equal to 63 μm kept | Done, Kish graphite having a size above or equal to 63 μm kept | Done, Kish graphite having an average particle size between 0.15 mm and 2 mm | Flushing step | Done with a solution of HCl and HNO3 in water |
| | Flotation step | Done | Not done | Done | Process of purification using a Preatment composition step | Done with a preatment solution comprising EDTA salt, $Na_2SO_3$, surfactant, anionic and nonionic polymer dispersant and distilled water |
| | Acid leaching step | Done with HCl, (the acid amount)/(kish graphite amount) ratio in weight is of 0.78 | Done with HCl, (the acid amount)/(kish graphite amount) ratio in weight is of 1.26 | Mechanical or Physical separation step | Done using ball mill and a magnet | Mechanical separation step | Done, Kish graphite having a size below or equal to 40 mesh, i.e. 420 μm, kept |
| Pre-treated kish graphite purity | | 95% | 74.9% | 90% | At least 90% | |
| Oxidation step | preparation of the mixture | Done with $H_2SO_4$ and $NaNO_3$ | Done with $H2SO_4$ and $NaNO_3$ | Done with Sulfuric acid (104%) | Done with $H_2SO_4$ and $NaNO_3$ | |
| | Addition of an oxidizing agent | $KMnO_4$ | $KMnO_4$ | | $KMnO_4$ | |
| | Element to stop the reaction | Water followed by $H_2O_2$ | Water followed by $H_2O_2$ | | Water followed by $H_2O_2$ | |
| | Exfoliation | Ultrasound | Ultrasound | Heating | Ultrasound | |
| Product obtained | | Graphene oxide having an average Lateral size from 20 to 35 μm with purity of 99.5% | Graphene oxide having an average lateral size from 20 to 35 μm with purity of 99.0% | Exfoliated Kish Graphite having a specific surface area of 128 $m^2 \cdot g^{-1}$ | Graphene oxide having an average size between 12 and 20.5 μm and an average thickness between 5 and 120 nm | |

*according to the present invention

The pre-treated kish-graphite obtained with Trial 1, i.e. by applying the method according to the present invention, has a higher purity compared to Trials 2 and 3. Moreover, the method of Trial 1 is more environmentally friendly than the method used for Trial 4. Finally, the graphene oxide obtained with Trial 1 has a high purity and high quality.

What is claimed is:

1. A method for the manufacture of graphene oxide from kish graphite comprising:
   A. providing kish graphite;
   B. pre-treating the kish graphite comprising the following successive sub-steps:
      i. a sieving step wherein the kish graphite is classified by size as follows:
         a) Kish graphite having a size below 50 μm,
         b) Kish graphite having a size greater than or equal to 50 μm,
         the fraction a) of kish graphite having a size below 50 μm being removed;
      ii. a flotation step with the fraction b) of kish graphite having a size above or equal to 50 μm;
      iii. an acid leaching step wherein an acid is added so that a ratio in weight (acid amount)/(kish graphite amount) is between 0.25 and 1.0; and
      iv. optionally, the kish graphite is washed and dried; and
   C. an oxidation step of the pre-treated kish graphite obtained after step B) in order to obtain graphene oxide.

2. The method according to claim 1, wherein in step B.iii), the (acid amount)/(kish graphite amount) ratio in weight is from 0.25 to 0.9.

3. The method according to claim 2, wherein in step B.iii), the (acid amount)/(kish graphite amount) ratio in weight is from 0.25 to 0.8.

4. The method according to claim 1, wherein in step B.iii), the acid is selected from the group consisting of: chloride acid, phosphoric acid, sulfuric acid, nitric acid or a mixture thereof.

5. The method according to claim 1, wherein step C) comprises the following sub-steps:
   i. preparing a mixture comprising the pre-treated kishgraphite, an acid and optionally sodium nitrate, the mixture being kept at a temperature below 5° C.,
   ii. adding an oxidizing agent into the mixture obtained in step C.i),
   iii. after a targeted level of oxidation is reached, adding an element to stop the oxidation reaction,
   iv. optionally, separating the graphite oxide from the mixture obtained in step C.iii),
   v. optionally, washing the graphite oxide,
   vi. optionally, drying the graphite oxide and
   vii. exfoliating into graphene oxide.

6. The method according to claim 5, wherein in step C.ii), the oxidizing agent is selected from the group consisting of: sodium permanganate, $H_2O_2$, $O_3$, $H_2S_2O_8$, $H_2SO_5$, $KNO_3$, NaClO or a mixture thereof.

7. The method according to claim 5, wherein in step C.iii), the element used to stop the oxidation reaction is selected from the group consisting of: an acid, non-deionized water, deionized water, $H_2O_2$ or a mixture thereof.

8. The method according to claim 7, wherein when at least two elements are chosen to stop the reaction, the at least two elements are used successively or simultaneously.

9. The method according to claim 5, wherein in step C.iii), the mixture obtained in step C.ii) is gradually pumped into the element used to stop the oxidation reaction.

10. The method according to claim 5, wherein in step C.vii), the exfoliating is performed by using ultrasound or thermal exfoliation.

11. The method according to claim 5, wherein in step C.iv), the graphene oxide is separated by centrifugation, by decantation or filtration.

12. The method according to claim 5, wherein steps C.iv) and C.v) are performed at least two times independently of each other.

13. The method according to claim 5, wherein in step C.i), the acid is selected from the group consisting of: chloride acid, phosphoric acid, sulfuric acid, nitric acid or a mixture thereof.

14. A method for the manufacture of graphene oxide from kish graphite comprising:
   A. providing kish graphite;
   B. pre-treating the kish graphite comprising the following successive sub-steps:
      i. a sieving step wherein the kish graphite is classified by size as follows:
         a) Kish graphite having a size below 55 μm,
         b) Kish graphite having a size greater than or equal to 55 μm,
         the fraction a) of kish graphite having a size below 55 μm being removed;
      ii. a flotation step with the fraction b) of kish graphite having a size above or equal to 55 μm;
      iii. an acid leaching step wherein an acid is added so that a ratio in weight (acid amount)/(kish graphite amount) is between 0.25 and 1.0; and
      iv. optionally, the kish graphite is washed and dried; and
   C. an oxidation step of the pre-treated kish graphite obtained after step B) in order to obtain graphene oxide μm.

15. A method for the manufacture of graphene oxide from kish graphite comprising:
   A. providing kish graphite;
   B. pre-treating the kish graphite comprising the following successive sub-steps:
      i. a sieving step wherein the kish graphite is classified by size as follows:
         a) Kish graphite having a size below 60 μm,
         b) Kish graphite having a size greater than or equal to 60 μm,
         the fraction a) of kish graphite having a size below 60 μm being removed;
      ii. a flotation step with the fraction b) of kish graphite having a size above or equal to 60 μm;
      iii. an acid leaching step wherein an acid is added so that a ratio in weight (acid amount)/(kish graphite amount) is between 0.25 and 1.0; and
      iv. optionally, the kish graphite is washed and dried; and
   C. an oxidation step of the pre-treated kish graphite obtained after step B) in order to obtain graphene oxide.

16. The method according to claim 15, wherein in steps B.i) and B.ii), the fraction b) of kish graphite has a size less than or equal to 300 μm, any fraction of kish graphite having a size greater than 300 μm is removed before step B.ii).

17. The method according to claim 15, wherein in steps B.i) and B.ii), the fraction b) of kish graphite has a size less than or equal to 275 μm, any fraction of kish graphite having a size greater than 275 μm is removed before step B.ii).

18. The method according to claim 15, wherein in steps B.i) and B.ii), the fraction b) of kish graphite has a size less than or equal to 250 μm, any fraction of kish graphite having a size greater than 250 μm is removed before step B.ii).

* * * * *